June 7, 1938.  C. H. BISSELL  2,120,123
SYSTEM FOR REGULATING CONTROLLERS
Filed April 28, 1937  2 Sheets-Sheet 1

INVENTOR.
Carl H. Bissell
BY Bridell & Thompson
ATTORNEYS.

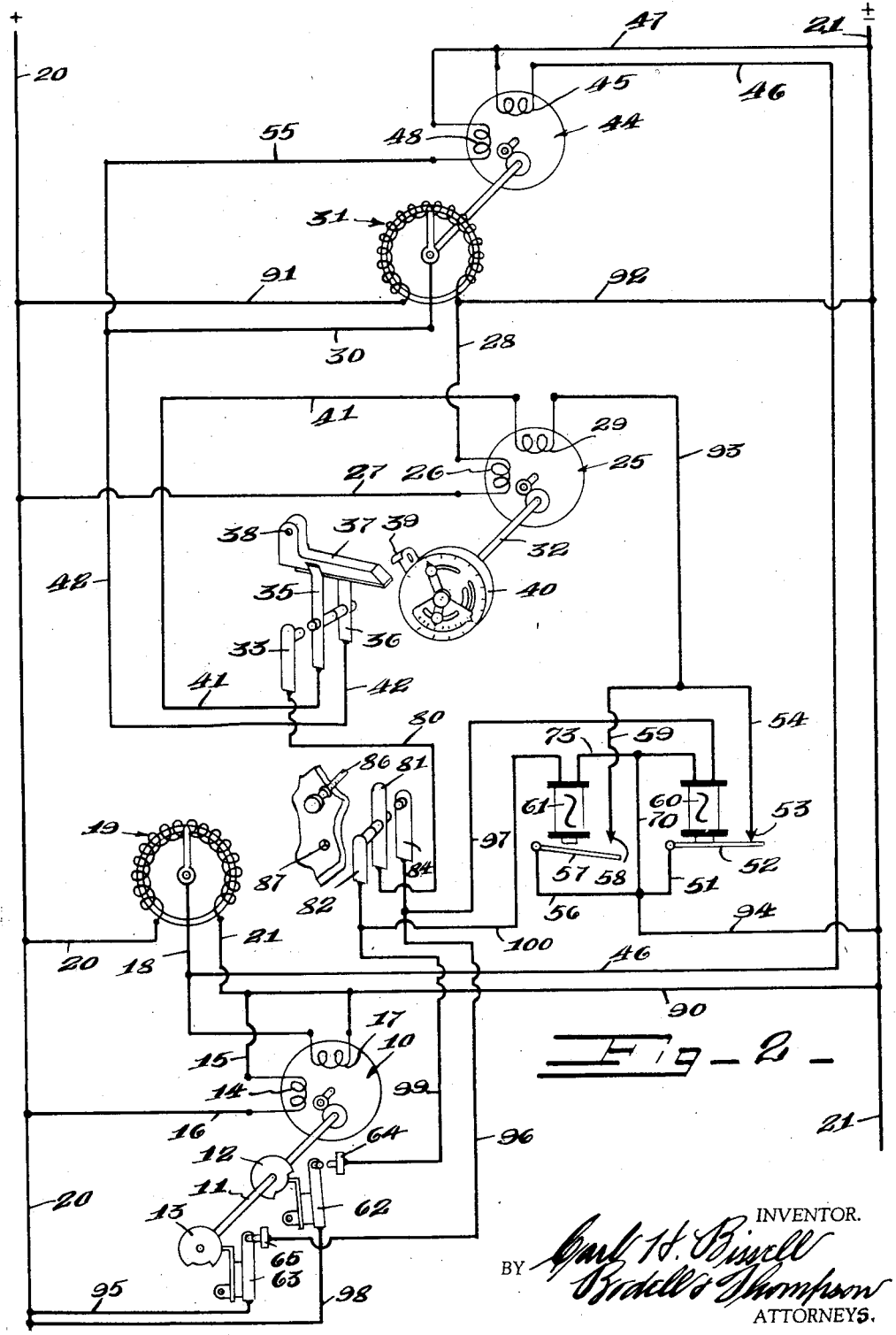

Patented June 7, 1938

2,120,123

UNITED STATES PATENT OFFICE 2,120,123

SYSTEM FOR REGULATING CONTROLLERS

Carl H. Bissell, Syracuse, N. Y., assignor to Crouse-Hinds Company, Syracuse, N. Y., a corporation of New York Application April 28, 1937, Serial No. 139,552

4 Claims. (Cl. 172—293)

This invention relates to a system for controlling a plurality of motors, and has as an object a particularly simple and economical system by which the speed of the motors may be varied and the motors maintained in synchronism.

The system is particularly applicable for controlling a plurality of timers or controllers, the operation of which must be correlated, such as a plurality of traffic signal timers installed at various street intersections throughout a signalized area.

The invention consist in the novel features and in the combinations and constructions hereinafter set forth and claimed.

In describing this invention, reference is had to the accompanying drawings in which like characters designate corresponding parts in all the views.

Figure 2 is an across the line wiring diagram of the apparatus shown in Figure 1.

Figure 1:
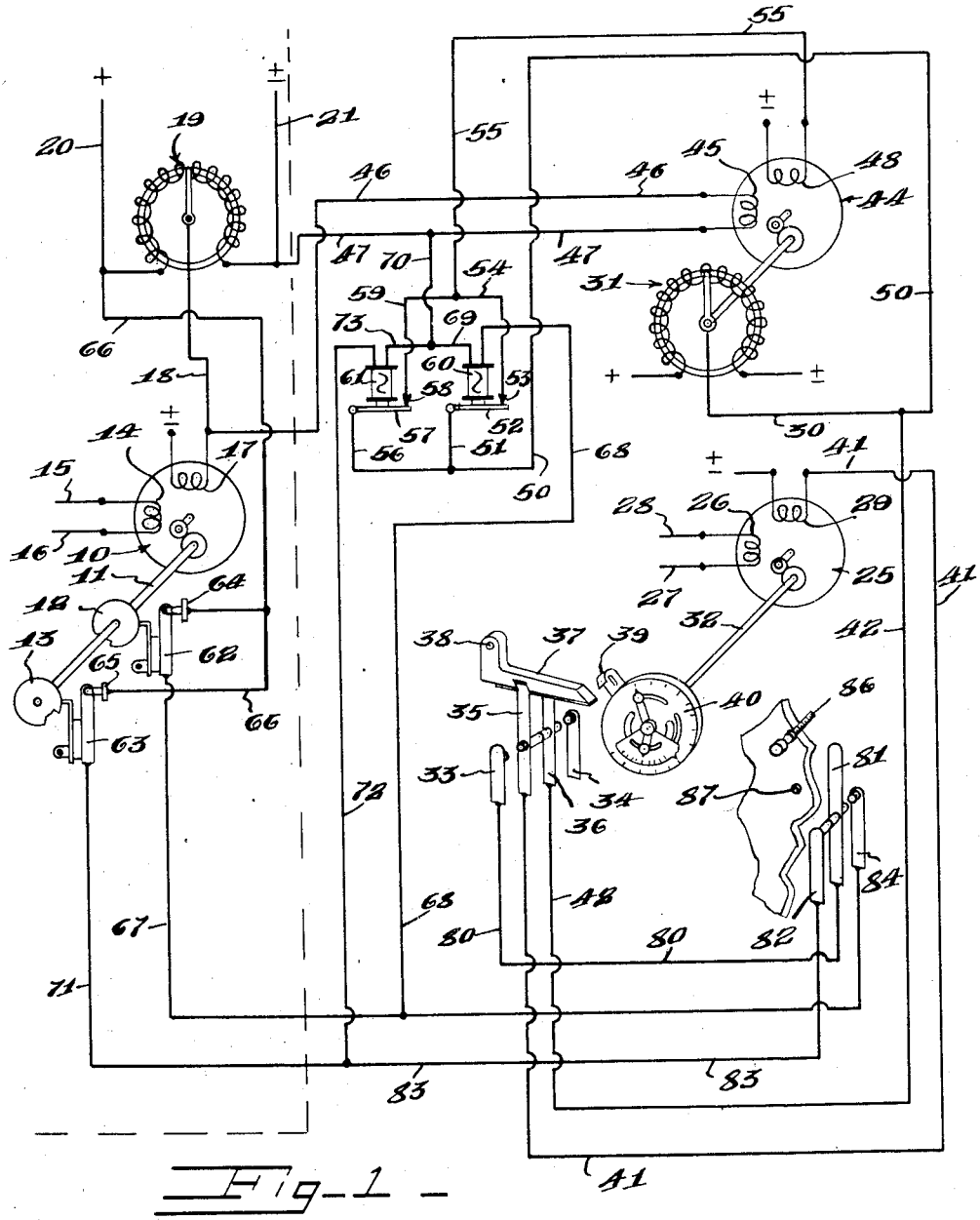
Figure 1 is a schematic wiring diagram of a master and one secondary controller illustrating the circuit connections between the same.

A traffic signaling system of the type to which this invention is applicable is described in my Patent No. 1,929,378, issued October 3, 1933. Briefly stated, such a system comprises a master controller comprising the apparatus set off to the left of the vertical dotted line Figure 1, and a plurality of secondary controllers each comprising the apparatus to the right of the dotted line Figure 1 located at each intersection of the signalized traffic system. The secondary controllers include cycle timers which operate to actuate the traffic signals at the various intersections through repeated traffic cycles.

The general object of such an interconnected system is to effect display of the signals successively at the various intersections of the system, whereby the traffic may move continuously in groups or platoons, and it is accordingly necessary to accomplish this result that the controller at each intersection be operated in a certain pretermined timed relationship with the other controllers located at adjacent intersections.

It is desirable, and sometimes necessary, that the speed at which the secondary controllers operate be varied, and also that all of the secondary controllers remain in synchronism. It is further desirable, and this invention has as a further object, the embodiment of means whereby, in the event the master controller becomes inoperative, the various secondary controllers will continue to operate in synchronism according to the predetermined plan on which they were operating when the master controller went out of commission.

The system comprises generally a master controller and a plurality of secondary controllers, said controllers including motors for actuating the same, and the motors including bucking or braking coils creating a force in opposition to the driving force of the motor to control the speed thereof.

The master controller includes further a voltage regulating device, the output circuit of which is connected to the braking coil of the master controller and also to one of the operating coils of a motor driven regulating device associated with the secondary controller. The output circuit of the second regulating device is connected to another operating coil of the motor operating said device and to the braking coil of the associated secondary controller, whereby any variation in the voltage of the circuit to either coil of the motor operating the second regulating device results in the operation of said device until a balanced condition exists between the output of the two regulating devices, and which variation results in a variation in the braking force of the braking coil associated with the secondary controller. Accordingly, the speed of the secondary controllers may be varied by adjusting the voltage regulating device associated with the master controller.

The secondary controller also includes means operable periodically by the controller to disconnect the braking coil of its motor from the output circuit of the second regulating device and to apply full braking voltage to the coil to stop the motor and secondary controller. The master controller includes one or more normally closed switches connected to the full voltage circuit and which are periodically opened to disconnect the braking coil from said circuit and permit the motor and secondary controller to again operate through another cycle. These last mentioned circuits effect the periodic resynchronizing of the secondary controllers with the master controller.

The master controller comprises a motor 10 operatively connected to a shaft 11 on which is secured cams 12, 13. The motor 10 is operated by a driving coil 14 connected to a feed circuit 15, 16. The speed of the motor 10 is controlled by a bucking or braking coil 17 connected to the output circuit 18 of a voltage regulating device 19 connected to a feed circuit 20, 21, which normally is the same circuit as the circuit 15, 16. The voltage regulator 19 is manually adjustable.

The secondary controller comprises a motor 25 operated by a driving coil 26 connected to a local feed circuit 27, 28, and the speed of this motor is controlled by a braking coil 29 connected to the output circuit 30 of a voltage regulating device 31 associated with the secondary controller. The motor 25 is operatively connected to a shaft 32 on which is mounted a plurality of cams or like elements operable to periodically open and close complemental switches which are connected in the traffic signal circuit. The cams, switches, signals etc., are omitted from the drawings for the sake of clarity, and such structures and their operation is well understood by those skilled in the art, and are fully described as in my Patent No. 1,929,378.

The secondary control apparatus further includes a switch comprising stationary contacts 33, 34, and movable contacts 35, 36. The movable contacts 35, 36 are normally in engagement and are moved out of engagement and into engagement with stationary contacts 33, 34, respectively by a switch arm 37 pivotally mounted at 38 and operated by a radially extending finger 39 adjustably mounted on dial 40 secured to and rotatable with shaft 32. The braking coil 29 of motor 25 is connected to the output circuit 30 of regulator 31 by wire 41, movable contacts 35, 36, wire 42, wire 30.

The voltage regulating device 31 is operated by a motor 44 operatively connected thereto and of the reversible type. The motor 44 is operated in one direction by an operating coil 45 connected in circuit to the output circuit 18 of regulator 19 associated with the master controller by wire 46, and the circuit is completed through wire 47, to the common return wire 21. The motor 44 is actuated in the opposite direction by a coil 48 connected to the output circuit 30 of regulator 31, the circuit comprising wires 50, 51, movable armature 52, contact 53, wires 54, 55, to the common side of the circuit. This circuit also extends through wires 56, movable armature 57, contacts 58, wire 59, to wire 55. The movable armatures 52, 57, are actuated into engagement with their respective stationary contacts 53, 58, by relays 60, 61, respectively. These relays are normally energized from the feed circuit at the master controller through normally closed switches 62, 63, which are opened by cams 12, 13, respectively. The stationary contacts 64, 65 of switches 62, 63, are connected to the high potential side of the feed circuit 20 by wire 66. The switch 62 is connected to relay 60 by wires 67, 68, and the circuit is completed by wires 69, 70, 47, to the return side of the circuit 21. The switch 63 is connected to relay 61, through wires 71, 72, and the circuit is completed through wire 73, to return wire 70.

The cams 12, 13, are arranged relatively so that the switches 62, 63, are opened successively. The arrangement is accordingly such that either relay 60 or 61 is energized and therefore, the circuit is always completed from the output circuit 30 to the coil 48 of motor 44. The purpose of the relays 60, 61 is that in the event of failure of the power circuit 20, 21, at headquarters, the secondary controllers will all continue to operate at the speed at which they were operating at the time of such failure. This is accomplished by opening the local output circuit 30 to the operating coil 48 of motor 44, the other operating coil 45 having already become deenergized through the circuit failure at headquarters.

From the description thus far, it will be apparent that the secondary motors 25 are operated at a speed depending upon the setting of the voltage regulator 19 at headquarters. If the regulator 19 is operated the voltage is varied in coil 45, causing the motor 44 to rotate in a direction depending on whether the voltage is increased or decreased in coil 45 by such adjustment. If the voltage is increased, the motor 44 operates the regulator 31 to increase the voltage of its output circuit 30 and accordingly, the opposed coil 48, until the driving force of the coils 45, 48, are balanced.

This change in the output circuit 30 is also communicated to the braking coil 29 of motor 25 and changes the speed thereof proportionately.

In order that the relative relationship of the secondary controllers may be maintained, these controllers are periodically synchronized with the master controller. This is accomplished when the finger 39 depresses arm 37, opening contacts 35, 36, and closing the contacts 35, 33. The circuit from the braking coil 29 is then disconnected from the output circuit 30 of regulator 31 and connected to the positive side 20 of the full voltage feed circuit at headquarters through wire 80, movable contact 81, stationary contact 82, wire 83, to wire 71. With this full line voltage, the braking coil 29 is effective to stop rotation of the motor 25. The motors 10, 25, are adjusted to run at substantially the same speed. However, the motor 25 rotates a trifle faster than the motor 10 and accordingly, the finger 39 contacts the switch arm 37 to disconnect the braking coil 29 from the regulator 31 and to connect it to the full line voltage just previous to the opening of the switch 63 by cam 13. Thus, the secondary motors are all stopped and simultaneously started by the opening of switch 63.

The valley in cam 13 is of sufficient length to permit rotation of the motor 25 and dial 40 to bring the finger 39 out of engagement with the switch arm 37 and to reestablish connection between coil 39 and regulator output circuit 30. The purpose of switch contacts 81, 82 and 84 is to permit the resynchronizing circuit to be connected through either wires 67 or 71. Inasmuch as the cams 12, 13 are offset relatively, any controller may be either started by the opening of the switch 62, or the opening of switch 63.

The object of having the two resynchronizing circuits 67, 71, with the cams 12 and 13 arranged in relatively offset position is to permit the dwell of the timer 32 to occur on a signal period other than the amber. That is, the amber period is usually very short compared with the length of the green or the red period and accordingly, after the individual timers were set to obtain the desired relative offset by adjustment of the finger 39, in some instances the dwell or stop period of a timer might occur when the amber was displayed. If this occurs, the switch contact 81 is shifted to the opposite stationary contact 82 or 84, and the graduations are such on the dial 40 that the finger 39 can also be shifted to maintain the offset desired and at the same time obtain the dwell or stopping of the timer in a different period of its own cycle. The movable switch contact 81 normally engages stationary contact 82 and is movable into engagement with contact 84 by threading screw 86 into aperture 87 formed in the frame of the controller.

In connection with the across the line diagram Figure 2, like reference numerals are used on portions of the circuit complemental to Figure 1 insofar as applicable.

In Figure 2, the legs of the voltage regulator are connected in circuit from positive wire 20, wire 21, wire 90, to the common side of the line. Running coil 14, of master motor 10, is energized by wire 16, wire 15, wire 90, to the common side of the circuit. Bucking coil 17, of motor 10, is energized from the adjustable leg of the voltage regulator 19 through wire 18, to wire 90. The adjustable leg of voltage regulator 19 is also connected through wire 46, to bucking coil 45 of motor 44, the circuit being completed through wire 47, to the common side of the line. The voltage regulator 31, operated by motor 44, is connected across the line by wires 91, 92, and the adjustable leg of the regulator is connected through wires 30, 55, to running coil 48, through wire 47, to the common side of the line. The running coil 26 of the timer motor 25 is energized through wire 27 from the positive side of the line, the circuit being completed through wires 28, 92, to the common side of the line.

From the circuit thus far described, it will be apparent that the speed of the timer motor 25 is determined by the adjustment of the voltage regulator 19 at headquarters, the adjustment of this regulator controlling the speed of the master motor 10 and the position of motor 44 operating the voltage regulator 31 which, in turn, controls the speed of the timer motor 25.

The bucking or braking coil 29 of timer motor 25 is also normally energized by voltage regulator 31, through wires 30, 42, contacts 36, 35, wire 41, and the circuit is completed through wires 93, 54, contact 53, armature 52, wires 51, 94, to the common side of the line. Armature 52 is maintained in engagement with contact 53 by energization of relay coil 60, the circuit being as follows: Wire 95, contacts 63, 65, wire 96, wire 97, coil 60, wires 70, 94, to the common side of the line.

When finger 39 depresses switch arm 37, contacts 35, 36, are separated, and contact 35 moved into engagement with contact 33. This results in disconnecting the braking coil 29 from the voltage regulator 31, and connecting the coil to full line voltage to effect stopping of motor 25. The full line voltage circuit is established from wire 96, contacts 84, 81, wire 80, contacts 33, 35, wire 41. This circuit is established when pin 86 is inserted in hole 87, moving contact 81 into engagement with contact 84. This circuit remains energized until cam 13 separates contacts 63, 65.

In the event contact 81 is arranged in engagement with contact 82, the full line voltage circuit to coil 29 is established through wires 98, contacts 62, 64, wire 99, contacts 82, 81, wire 80, contacts 33, 35, wire 41, coil 29. In this event, relay coil 61 is energized by wire 100 connecting the coil with wire 99, in which event the return circuit for braking coil 29 is completed through wires 93, 59, contact 58, armature 57, wires 96, 94, to the common side of the line.

What I claim is:

1. In a regulating system of the class described, the combination of a voltage regulating device, a motor connected to said device and being operable to actuate said device to vary the voltage of the output circuit thereof, said motor having a driving coil connected to a feed circuit and a second coil acting to effect rotation of said motor in reverse direction connected to the output of said device, a controller including a driving motor having a braking coil connected in circuit with the output of said device and applying a predetermined braking force less than the driving force of said motor, said last mentioned circuit including a normally closed switch, means operated by said controller to periodically open said switch and to apply full braking voltage to said braking coil to stop said motor, and switch means periodically operated independently of said controller to disconnect said coil from said full voltage circuit and permit said motor to operate said controller.

2. In a regulating system of the class described, the combination of a master controller, a secondary controller, said controllers each including an electric driving motor having braking coils, a voltage regulating device associated with said secondary controller, mechanism for actuating said device to vary the output thereof, a second voltage regulating device associated with said master controller with the output circuit thereof connected to the braking coil of the master controller motor, the output circuit of both of said devices being connected to the actuating mechanism of said first mentioned regulating device and acting in opposition to actuate said device until the force of both circuits is balanced, the output circuit of said first voltage regulating device being also connected to the braking coil of the secondary motor to apply a braking force less than the driving force of said motor and effect operation of said motor at a speed substantially the same as the speed of the master controller, said braking coil circuit also including a normally closed switch, means operated by said secondary controller for periodically opening said switch and connecting said braking coil to a high voltage circuit to stop said controller, and means operated by said master controller for periodically opening said last mentioned circuit.

3. In a regulating system of the class described, the combination of a master controller, a secondary controller, said controllers each including an electric driving motor having braking coils, a voltage regulating device associated with said secondary controller, mechanism for actuating said device to vary the output thereof, a second voltage regulating device associated with said master controller with the output circuit thereof connected to the braking coil of the master controller and to the actuating mechanism of said first voltage regulating device, the output circuit of said first voltage regulating device being connected to the actuating mechanism of said device and acting in opposition to the output circuit of said second voltage regulating device to actuate said first device until the force of both of said circuits is balanced, the output circuit of said first voltage regulating device being also connected to the braking coil of the secondary motor through a normally closed switch to apply a braking force less than the driving force of said motor and effect operation of said motor and controller at a speed substantially the same as the speed of the master controller, said braking coil circuit also including a second normally closed switch, means operated by the secondary controller for periodically opening said second switch and connecting said braking coil to a high voltage circuit, an electro-responsive device for operating said first switch and being connected to said high voltage circuit, said high voltage circuit including a normally closed switch and means operated by said master controller for periodically opening said last mentioned switch.

4. In a regulating system of the class described, the combination of a primary controller and a secondary controller, each of said controllers including an actuating motor having a driving coil connected to a feed circuit, a control coil for the motor of said secondary controller, a control circuit including a regulating means and a normally closed switch connecting said control coil to the output of said regulating means, a motor operatively connected to said regulating means including a driving coil connected to the output of said regulating means, a second regulating means associated with said primary controller, and means connected to the control coil of said motor and to a control coil of the motor associated with said first regulating means and acting in opposition to the driving coil thereof, means operated by said secondary controller for periodically opening said switch and connecting a circuit of higher voltage to the control coil of the motor associated with said secondary controller to stop the same, and a switch operated by said primary controller for opening said last mentioned circuit and permitting the driving coil of the motor associated with said secondary controller to again actuate said controller.

CARL H. BISSELL